Feb. 13, 1973　　　A. WERNER　　　3,716,651
MINIMUM WIRE BOX AND DEVICE ADAPTERS
Filed July 14, 1971
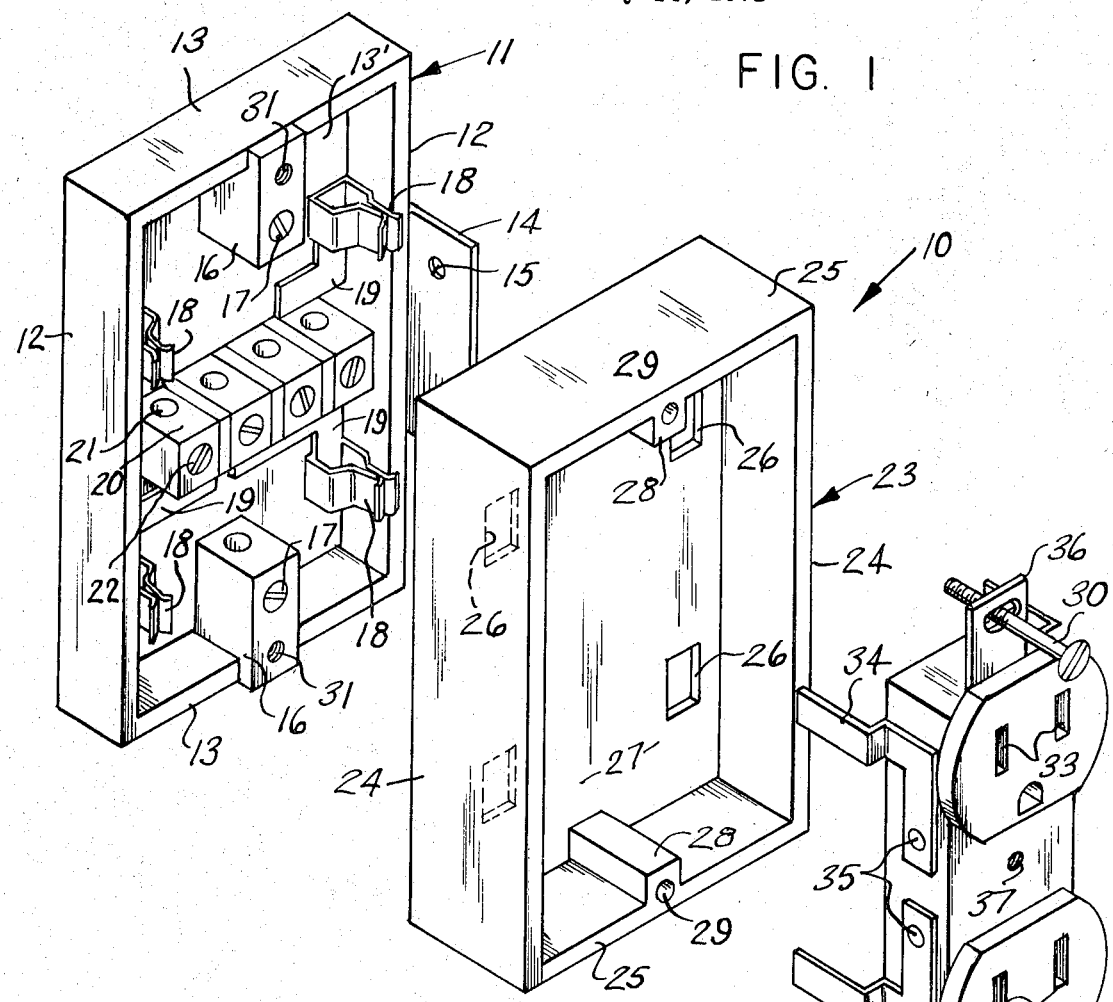
FIG. I
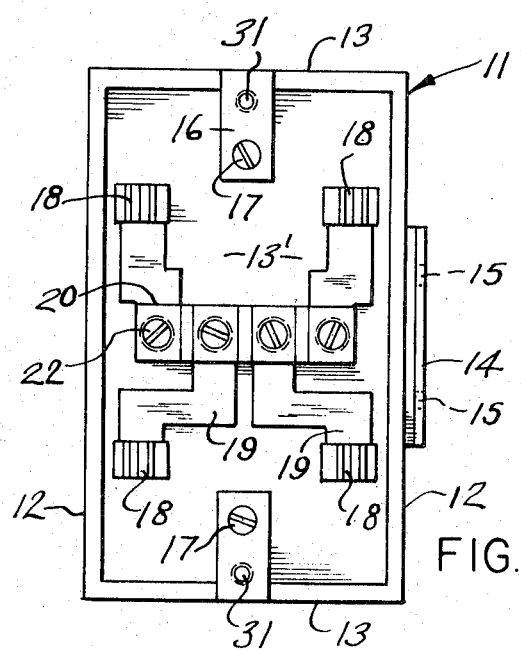
FIG. 2
INVENTOR.
ARDWIN WERNER United States Patent Office 3,716,651
Patented Feb. 13, 1973

3,716,651
MINIMUM WIRE BOX AND DEVICE ADAPTERS
Ardwin Werner, R.F.D. 3, Batesville, Ind. 47006
Filed July 14, 1971, Ser. No. 162,537
Int. Cl. H02g 3/18
U.S. Cl. 174—53                                          1 Claim

ABSTRACT OF THE DISCLOSURE

A plug receiving and switch adaptable device. This device is primarily for the purpose of eliminating the excess wire normally required to make electrical connections to switches, receptacles and the like, and includes a rectangular base with spring clip means received within openings of the outer box shell which receives the plug receptacle or other unit.

This invention relates to outlet boxes and the like for electrical wiring.

It is therefore the primary purpose of this invention to provide a minimum wire box and device adapters which will be made of a suitable dielectric material and will eliminate the excess wire heretofore required of the prior art in making electrical connections to switches, receptacles and the like.

Another object of this invention is to provide a device of the type described which will be of a smaller size than the prior art.

A further object of this invention is to provide a device of the type described which will accommodate wires of increased size and when wiring the device, connections may be made much easier.

Yet another object of this invention is to provide a device which will include a rectangular base portion which will have peg means for mounting it to a wall stud and the outlet box shell will be secured to the base by screw means which also renders the plug receptacle unit or other unit stationary to the device.

Other objects of the present invention are to provide a minimum wire box and device adapter which is simple in design, inexpensive to manufacture, rugged in construction, easy to use and efficient in operation.

These and other objects will become readily evident upon a study of the following specification together with the accompanying drawing wherein:

FIG. 1 is an exploded perspective view of the present invention; and

FIG. 2 is a front view of the base member shown removed from FIG. 1 and shown in elevation.

According to this invention, a minimum wire box 10 is shown to include a rectangular configurated base 11 made of a suitable dielectric material. Base 11 consists of parallel side walls 12, parallel end walls 13 and a back wall 13'. A plate 14 extends forwardly of base 11 and is fixedly secured or molded integral therewith and is provided with a pair of spaced apart openings 15 providing a means of securing base 11 to a wall stud (not shown).

A pair of oppositely opposed and aligned block portions 16 on the interior of base 11, are provided with screw fasteners 17 and block portions 16 extend forwardly of base 11 for a purpose which hereinafter will be described. A plurality of spaced apart spring clips 18 extend off of electrical contacts 19 which are carried within a multiple tier block portion 20 having openings 21 for the insertion of wires. The block portion 20 also includes a plurality of screw fasteners 22 for securing the wires within the opening 21.

An outlet box shell 23 of similar rectangular shape as base 11 is fitted against the face of base 11 and the projecting block portions 16 aid as alignment means for base 11 and shell 23 by the block portions 16 being received within openings in the rear of shell 23 (not shown). The base 11 and the shell 23 are further aligned by means of a plurality of rectangular openings 26 through the back wall 27 of shell 23.

Shell 23 includes a pair of parallel side walls 24 and a pair of parallel end walls 25 and the spring clips 18 are freely received within the openings 26 and are insulated therefrom by the material of shell 23 being of a similar dialetric material such as that of base 11 of device 10.

A pair of aligned projections 28 are integral with the interior of shell 23, are each provided with an opening 29 which freely receives a screw fastener 30 which threadingly engages the internally threaded opening 31 of the block portion 16 of base 11.

A plug receptacle unit 32 having electrical plug openings 33 includes a plurality of spaced apart and projecting prongs 34 which serve to engage with the electrical contact tips 18 of base 11. The prongs 34 are secured fixedly to the sides of unit 32 by means of suitable fasteners 35. An outwardly extending lug 36 on the end of each unit 32 also receives the pair of screw fasteners 30 so as to render unit 32 stationary within the base 11 and the shell 23.

In use, the shell is placed so that the spring clips 18 are aligned and received within the openings 26 of the back wall 27 of shell 23. The prongs 34 of the plug receptacle unit 32 are then inserted snapably into the spring clips 18 and thus form an electrical outlet box of unique and novel structure wherein the plug receptacle unit may be secured therein by means of screw fasteners 30 which engage with the openings 31 of base 11.

It shall be noted that a switch unit similar to the structure of unit 32 having the prongs 34 may be inserted in the same manner within the shell 23 which is carried flush with the base 11 of device 10.

It shall be noted further that minor changes may be made in the overall structure of device 10 without departing from the spirit and scope of the herein described invention.

What I now claim is:

1. A minimum wire box and device adapter, comprising a hollow rectangular base member, electrical contacts and spring clips carried by said base member for securing electrical wiring thereto for engagement with a plurality of spaced apart and extending prongs of a plug receptacle unit, a plate carried by said base providing a means of securing it to a wall stud, projection means carried by said base providing alignment means for a hollow rectangular shell carried by said device, said prongs extending through said rectangular shell and engaging said spring clips of said base, said base, said shell, and said pronged receptacle being secured together as an assembly by means of a pair screw fasteners.

References Cited

UNITED STATES PATENTS

| | | | |
|---|---|---|---|
| 2,397,688 | 4/1946 | Osinski | 174—53 |
| 2,410,287 | 10/1946 | Jaberg | 174—53 |
| 2,433,917 | 1/1948 | McCartney | 174—53 |
| 2,920,303 | 1/1960 | Johnson | 174—53 UX |
| 3,038,141 | 6/1962 | Chiuchiolo | 174—53 X |

BERNARD A. GILHEANY, Primary Examiner

D. A. TONE, Assistant Examiner

U.S. Cl. X.R.

174—59; 339—122